(12) United States Patent
Mazur et al.

(10) Patent No.: US 8,584,221 B2
(45) Date of Patent: Nov. 12, 2013

(54) AUTHENTICATING USING CLOUD AUTHENTICATION

(75) Inventors: Leszek Mazur, Kirkland, WA (US); Jianhui Xie, Redmond, WA (US); Sean D. Daniel, Victoria (CA); Cesare John Saretto, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 12/604,673

(22) Filed: Oct. 23, 2009

(65) Prior Publication Data

US 2011/0099616 A1 Apr. 28, 2011

(51) Int. Cl.
*G06F 7/04* (2006.01)

(52) U.S. Cl.
USPC .......................................................... 726/8

(58) Field of Classification Search
USPC .................. 726/6–8; 713/168, 155, 172
See application file for complete search history.

(56) References Cited

U.S. PATENT DOCUMENTS

| | | | |
|---|---|---|---|
| 6,339,423 B1 * | 1/2002 | Sampson et al. ............... | 715/854 |
| 7,308,579 B2 | 12/2007 | Abela | |
| 2003/0093690 A1 * | 5/2003 | Kemper ........................ | 713/201 |
| 2004/0122960 A1 | 6/2004 | Hall et al. | |
| 2005/0172229 A1 | 8/2005 | Reno et al. | |
| 2009/0177514 A1 | 7/2009 | Hudis et al. | |
| 2009/0228967 A1 * | 9/2009 | Gbadegesin et al. ............. | 726/8 |
| 2009/0293108 A1 * | 11/2009 | Weeden ........................... | 726/6 |

FOREIGN PATENT DOCUMENTS

| EP | 2101276 A1 | 9/2009 |
|---|---|---|
| WO | 03060718 A1 | 7/2003 |

OTHER PUBLICATIONS

Betts, Dominic, "LiveID, Authentication and the Cloud.", Retrieved at <<http://cm-bloggers.blogspot.com/2009/06/liveid-authentication-and-cloud.html, Jun. 1, 2009, pp. 4.
Lorch, et al., "Authorization and Account Management in the Open Science Grid.", Retrieved at <<http://ieeexplore.ieee.org/stamp/stamp.jsp?arnumber=1542719&isnumber=32950>>, Nov. 13-14, 2005, pp. 17-24.
"Windows Live ID Delegated Authentication SDK for Application Providers.", Retrieved at <<http://msdn.microsoft.com/en-us/library/cc287637.aspx>>, 2009, pp. 2.
"Windows Live ID Client Authentication.", Retrieved at <<http://www.devx.com/codemag/Article/38079/1763/page/3>>, Sep. 23, 2009, pp. 4.
International Search Report, Mailed Date: Jun. 21, 2011, Application No. PCT/US2010/052309, Filed Date: Oct. 23, 2009, pp. 10.

* cited by examiner

*Primary Examiner* — Beemnet Dada
(74) *Attorney, Agent, or Firm* — Rau Patents, LLC

(57) ABSTRACT

An authentication mechanism in a local area network may use a cloud authentication mechanism to allow or deny authentication requests. A user may gain access within a local area network by entering a cloud identification and password, which may be verified by a cloud authentication mechanism. If the authentication is successful from the cloud authentication mechanism, the user identification and password are stored locally for subsequent authentication requests. In some embodiments, the cloud password may be periodically flushed so that subsequent requests may be passed to the cloud authentication mechanism. The authentication mechanism may be used in both domain and workgroup local area networks, and may operate in parallel with other users who may have local area network or client credentials which may not be authenticated from the cloud.

18 Claims, 4 Drawing Sheets

AUTHENTICATING USING CLOUD AUTHENTICATION

BACKGROUND

Many computer users have online accounts for various web-based services. These online accounts may be for email services, purchasing products, access to word processing or other applications, social networking services, and many other uses.

The web based services, also known as cloud services, may have various authentication mechanisms. In some cases, a cloud service may have very simple authentication that consists of only a user identification and password, chosen by the user. Such authentication mechanisms may be anonymous. Other cloud services may use a credit card or other mechanism to verify user identity. In such services, an online identification may be traced back to an actual human being using the credit card or other mechanism.

SUMMARY

An authentication mechanism in a local area network may use a cloud authentication mechanism to allow or deny authentication requests. A user may gain access within a local area network by entering a cloud identification and password, which may be verified by a cloud authentication mechanism. If the authentication is successful from the cloud authentication mechanism, the user identification and password are stored locally for subsequent authentication requests. In some embodiments, the cloud password may be periodically flushed so that subsequent requests may be passed to the cloud authentication mechanism. The authentication mechanism may be used in both domain and workgroup local area networks, and may operate in parallel with other users who may have local area network or client credentials which may not be authenticated from the cloud.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
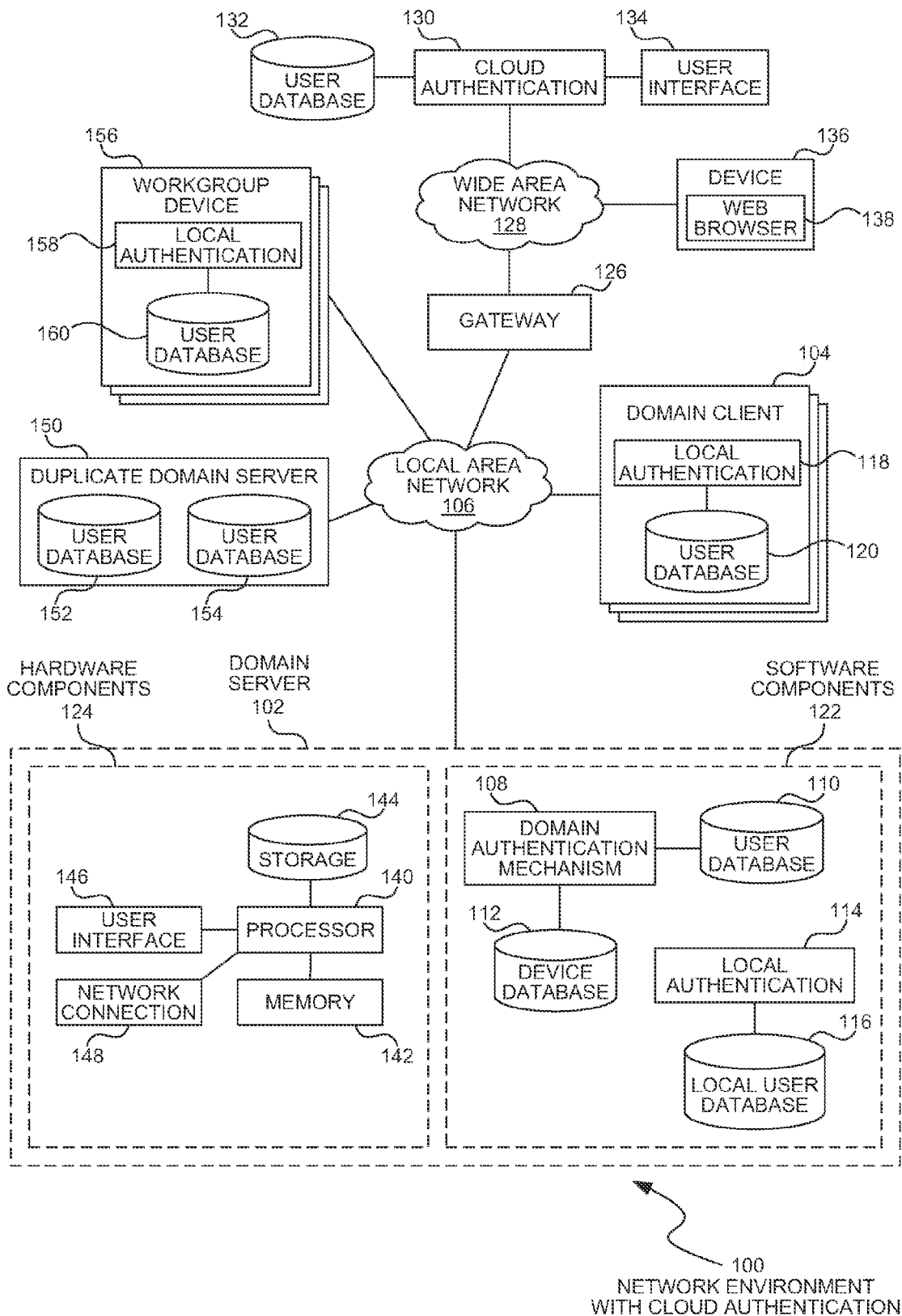
FIG. 1 is a diagram illustration of an embodiment showing a network environment that may include cloud authentication.

A user may use cloud credentials within a local area network environment to authenticate a workgroup or domain login. The cloud credentials may be stored locally at the device or domain level and used for future authentications. The cloud credentials may be periodically refreshed with a cloud authentication mechanism.

The cloud authentication mechanism may allow a user to access their home, business, or other computer using credentials that may be verified by a remote third party in the form of a cloud authentication mechanism. The user may have a single set of login credentials for cloud services and local computer access.

A local authentication mechanism on a client or domain device may be configured to provide authentication services at a device or domain level. The local authentication mechanism may have a database in which user identifications and passwords are stored, often in a hashed or encrypted form. When a user account is configured for cloud authentication, the user's credentials may be passed to a cloud authentication mechanism and, if properly authenticated by the cloud authentication mechanism, the credentials may be stored in the local database. Subsequent authentication requests may then be processed by the local authentication mechanism.

The user may connect to the cloud authentication mechanism and perform a password change. The next time the user attempts to log onto the local system, a local authentication may trigger a request to the cloud authentication mechanism using the new user credentials because the new credentials may not match the credentials in the local database.

The local authentication mechanism may periodically refresh or synchronize the locally stored password with the cloud authentication mechanism. In some embodiments, the local authentication mechanism may periodically delete the password in order to force a cloud authentication on the next login. In other embodiments, the local authentication mechanism may periodically send the login credentials to the cloud authentication mechanism to verify that the credentials are still valid. If the credentials are found to be invalid, the credentials may be removed from the local database and may be refreshed when the user logs in at a later time.

The local authentication mechanism may be deployed in a workgroup environment and may serve as an authentication mechanism for local, device specific accounts. The local authentication mechanism may also be deployed in a domain environment and may be used to grant domain level access.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and may be accessed by an instruction execution system. Note that the computer-usable or computer-readable medium may be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" may be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a network environment in which a cloud authentication mechanism may operate. Embodiment 100 is a simplified example of a network environment in which a domain or workgroup based authentication mechanisms may use a cloud based authentication mechanism to allow or deny credentials for a user login.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

A cloud authentication mechanism may be used to authenticate users to a domain or workgroup. Credentials that may be submitted by a user to a local authentication mechanism may be forwarded to a cloud authentication mechanism. If the cloud authentication mechanism allows the credentials, the user credentials may be stored locally and used for subsequent authentications.

Throughout this specification, the term "authentication mechanism" may be used to refer to any system, device, application, service, or other function that may perform authentication. Authentication refers to a process for confirming the identity of a user based on credentials presented by the user. In many cases, the credentials may include a public portion and a private portion. In a simple set of credentials, the public portion may be a username and the private portion may be a password.

In a domain or workgroup environment, some or all of the user accounts may be configured for cloud authentication. Such a configuration may be used when the administrator of a local system allows the cloud authentication mechanism as a trusted authentication mechanism. The configuration may assume a one-way trust between the local system and the cloud authentication mechanism. The one-way trust may be that the local system accepts the cloud authentication mechanism for verifying the credentials of a user on the local system, but the cloud authentication system may not accept the local system's authentication for any other cloud-authenticated services.

For cloud based authentication, a user may present credentials that may be analyzed by and allowed or denied by the cloud authentication mechanism. Typical credentials may be a user identification and password, but other embodiments may use hardware authentication such as a card reader that may use credentials from a smart card, credit card, driver's license, passport, or similar device. In such embodiments, a user may be issued credentials by a trusted party, such as a government agency, security organization, or other organization, and the credentials may include computer-readable storage on which credentials may be stored. Some such embodiments may use hardware supplied credentials with other credentials, such as a user identification and password to verify a person's identity.

Biometric credentials may be used in some embodiments as part of the user credentials. Biometric credentials may be captured using a fingerprint reader, retinal scanner, voice recognition, or other biometric sensing. In such embodiments, the biometric credentials may be captured on a local device and transmitted to the cloud authentication mechanism for verification. In embodiments where biometric scanning is used, user consent may be received before collecting, transmitting, storing, or using such data.

Some embodiments may permit different sets of credentials for a user. For example, an embodiment may perform authentication with a user identification, password, and a hardware device such as a smart card. The same embodiment may perform the same authentication with just a user identification and the output from a local biometric scan.

Different embodiments may use different types of user identification. In many embodiments, a user identification may be a login name, for example. Some embodiments may allow a user to create their own login identification. Such embodiments may be used in cases where anonymous logins are permitted or where the user may be able to enter a login name that is easy for the user to remember. Other embodiments may use an email address as the person's login identification. The email address may include a username and a domain name and are generally not duplicated between multiple persons.

The cloud authentication mechanism 130 may be any authentication mechanism to which a local authentication mechanism may have at least a one-way trust configured. A typical embodiment may be a web service that has credentials for accessing web-based services. In many embodiments, a centralized cloud authentication mechanism 130 may be used to gain access to many different web-based services. Such services may include email services, social networks, various web-based applications, and other services.

Many different types of cloud authentication mechanisms may be used. In some cloud authentication mechanisms, a user may be able to create their own account with a cloud service by providing a user name and password. Some such mechanisms may allow a user to create anonymous logins that may not have any further verification to a real person.

In some cloud authentication mechanisms, a user may provide a credit card number and other information that may be verified by a credit card company. The credit card and other information, such as name, address, and telephone number, may be transmitted to the credit card company, who may in turn authenticate the information. The cloud authentication mechanism may allow the credit card company's authentication and may match the user credentials to the real person to whom the credit card was issued.

Some cloud authentication mechanisms may include some human verification of a user's credentials. For example, a security department within a corporation may issue a smart card to employees while configuring an authentication mechanism for use by employees and vendors. The smart card may include a photograph of the user, along with biometric or other information, such as a unique sequence of characters. Some such embodiments may use a Globally Unique Identifier (GUID) or other sequence. The GUID may be transmitted as part of the user credentials and used by the corporation's authentication mechanism. Such an authentication mechanism may be used as a cloud authentication mechanism.

Many devices have a local authentication mechanism and local user databases. The local authentication mechanism may allow a user to login using a login name and operate the device using a user account. Many devices may allow multiple users to have accounts on a device. In many cases, each user account may have different access permissions or may allow each user to customize a user interface for the device. Some devices may have a local authentication mechanism and local user database even when only one user accesses the device.

In a domain environment, a domain server 102 may provide authentication services for domain clients 104 attached to a local area network 106. The domain environment may be configured so that a user may use the same credentials when logging into different domain clients 104. Some such embodiments may provide a common user interface on multiple devices, access to the same files from different devices, and other features so that users may roam between devices and maintain many common experiences.

The domain server 102 may be a server computer within the local area network 106. The domain server 102 may have several software components 122 that operate on a hardware platform made up of hardware components 124.

The domain server's software components 122 may include a domain authentication mechanism 108 that may include a user database 110 and a device database 112. The domain authentication mechanism 108 may receive authentication requests from users on various client devices and allow or deny authentication based on the credentials presented by a user. The user credentials may be stored in the user database 110, and the domain authentication mechanism 108 may query the user database 110 to determine if there is a match with the credentials presented by a user.

In some embodiments, each device within the domain may be listed in the device database 112. In some such embodiments, a device may connect to the domain authentication mechanism 108 to connect to services provided by the domain server 102, which may include Domain Name Services (DNS), Dynamic Host Configuration Protocol (DHCP), file sharing services, and many other services. Such services may be engaged when the device powers up or connects to the local area network 106 prior to or after a user attempts to logon to the domain using the client device.

In some such embodiments, a user may perform a valid login only when using a device that has an entry in the device database 112.

The domain server 102 may include a local authentication mechanism 114 and a local user database 116. The local authentication mechanism 114 may provide authentication services for local user accounts on the domain server 102. A local user account may be a user account that allows a user to log onto and use the domain server 102 directly. For example, many domain servers may have a local administrator account so that an administrator may log into the domain server and perform configuration of the server. The local administrator account may allow access to the domain server 102 and may not be connected to or dependent on domain services to operate.

Similarly, the domain clients 104 may have a local authentication mechanism 118 and a local user database 120. A user may have an account in the local database 120 that may permit the user access to the resources of the domain client 104 but not to domain services.

A duplicate domain server 150 may provide domain services similar to the domain server 102 in larger environments. The duplicate domain server 150 may have a user database 152 that may be a copy of the user database 110, as well as a device database 154 that may be a copy of the device database 112. Some embodiments may be configured so that some of the domain clients 104 are assigned to the domain server 102 while other domain clients 104 are assigned to the duplicate domain server 150. Some embodiments may employ various load balancing or other arrangements so that the authentication workload may be shared between the domain server 102 and the duplicate domain server 150.

Workgroup devices 156 may be devices that are connected with the local area network 106 and may share resources, such as files, but without a centralized server such as the domain server 102. In a domain architecture, a server may provide authentication for users, while in a workgroup architecture, authentication may be provided only by a local authentication mechanism 158 using a local database 160.

In many embodiments, the domain server 102 may include a user interface through which an administrator may setup and configure user accounts. The user accounts may identify a user with a user name and various permissions or settings that define how the user may interact with services on the domain. For example, a first user may be given administrator privileges within the domain and may be able to perform configuration and setup tasks for certain services. A second user may be given restricted user privileges within the domain and may be able to consume the services but not configure them.

Many local authentication mechanisms may also have a user interface through which an administrator may add, delete, and configure user accounts.

When configuring a user account, an administrator may indicate that a specific user account may be cloud authenticated. The administrator may be able to identify the cloud authentication mechanism for each indicated user. The administrator may be able to set up a cloud authentication mechanism by indicating an address or other parameters used to communicate with the cloud authentication mechanism 130. In some embodiments, the administrator may be able to configure two or more cloud authentication mechanisms.

By selecting a user account for cloud authentication, the administrator may be establishing trust between the local or domain authentication mechanism and the cloud authentication mechanism 130. The trust may indicate that any authentication allowed or denied by the cloud authentication mechanism may be followed at the local or domain level. Examples of methods used by the various authentication mechanisms are illustrated in embodiments 200 and 300 presented later in this specification.

The cloud authentication mechanism 130 may be reached from the local area network 106 through the gateway 126 and the wide area network 128. The wide area network 128 may include the Internet in many embodiments.

The cloud authentication mechanism 130 may include a user database 132 in which user credentials may be stored, as well as a user interface 134. In many cases, the user interface 134 may be in the form of web pages that may be accessed using a device 136 attached to the wide area network 128 and using a web browser 138.

In a typical embodiment, a user may establish an account with the cloud authentication mechanism 130. In establishing the account, the user may present credentials such as a user name and password. In some cases, the cloud authentication mechanism 130 may ask for additional credentials such as a credit card, driver's license, or other identifier.

In some cases, an administrator may configure a user account for each user with the cloud authentication mechanism 130. The user account may be configured to locally access a specific device, such as for a domain client 104 or a workgroup device 156, or for a domain account that may grant access to domain wide services. For example, an administrator may create a new account within the local or domain databases and establish credentials that may include a user name and password. The password may be an initial password that may be changed later by the user. The administrator may transmit the domain credentials to the cloud authentication mechanism 130 and establish an account using the user name and password in the respective user database. The user's account may be flagged as a cloud authenticated account and when the user logs into the account, the user's credentials may be authenticated by the cloud authentication mechanism 130.

When a user has a cloud authenticated account, the user may manage the account by communicating directly with the cloud authentication mechanism 130. For example, the user may change their password or other login credentials by connecting to the cloud authentication mechanism user interface 134 using a web browser. The user may first authenticate the web browsing session, and may then enter new credentials.

In some embodiments, software operating on a domain client 104 or domain server 102 may enable a user to update their credentials on the local device and have the updated credentials transmitted to the cloud authentication mechanism 130 for updating.

The domain server 102 may have a hardware platform having a processor 140, random access memory 142, and non-volatile memory or storage 144. The hardware components 124 may also include a user interface 146 and network connection 148.

The hardware components 124 may be a personal computer, server computer, laptop or desktop computer, or any other computing device. In some embodiments, the hardware components 124 may be a handheld device such as a mobile telephone, personal digital assistant, handheld scanner, or other device.

Figure 2:
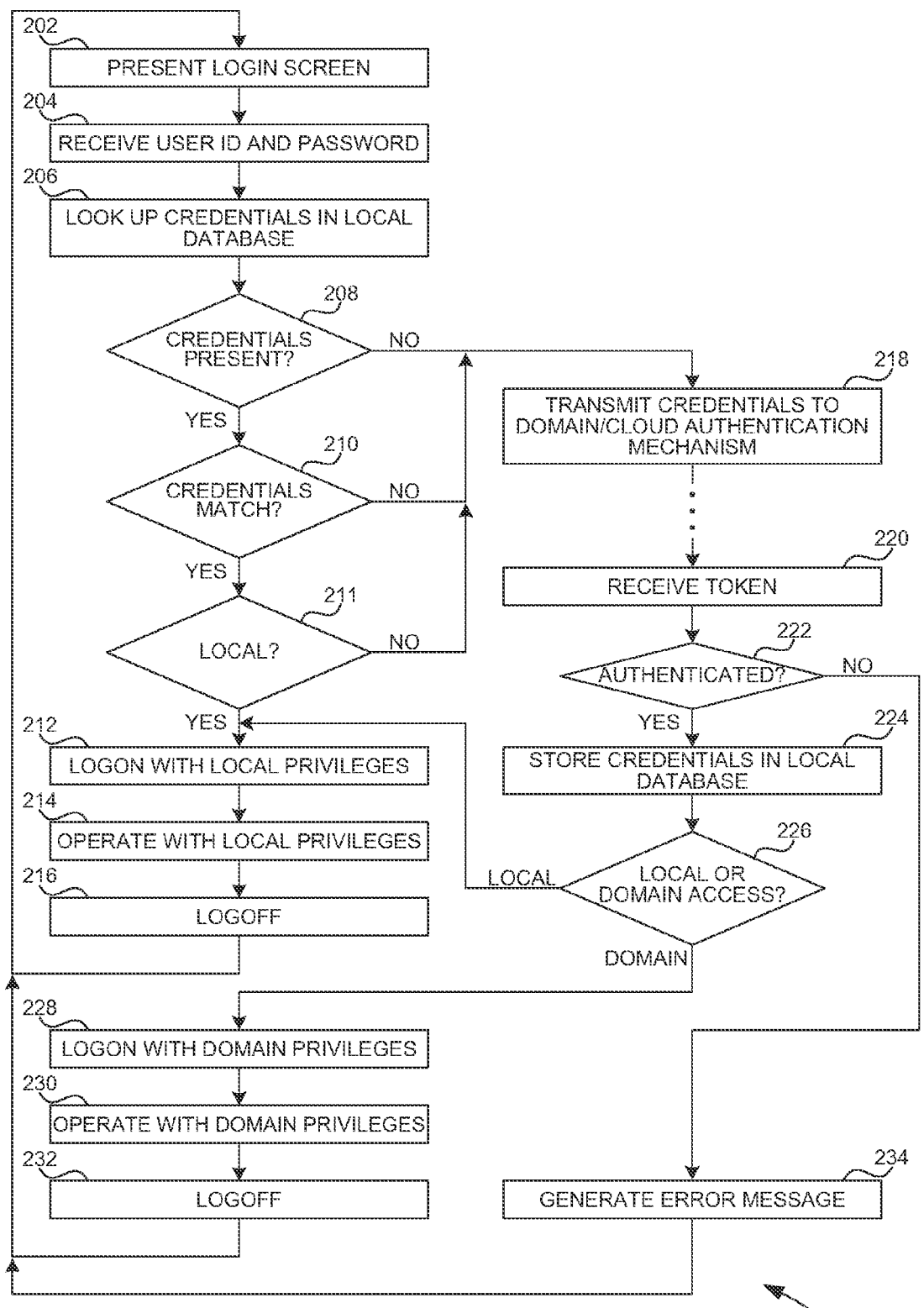
FIG. 2 is a flowchart illustration of an embodiment showing a method for client operation with cloud authentication.

FIG. 2 is a flowchart illustration of an embodiment 200 showing a method for operating a client device with cloud authentication. Embodiment 200 is a method that may be performed by a workgroup or domain client device when using cloud authentication.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of an authentication process that may be performed by either a domain client or a workgroup device, such as the domain client 104 or workgroup device 156 of embodiment 100. Embodiment 200 illustrates a method for authenticating a user on the device or domain.

In block 202, a login screen may be presented, and a user identification and password may be received in block 204.

Many different mechanisms may be used to receive credentials from a user in blocks 202 and 204. In a personal computer, a login screen may cover a display and permit access only when properly authenticated. In some instances, a user may have to press Control, Alt, and Delete on a keyboard to reach the login screen as a security measure.

In some cases, a user may log in by presenting other types of credentials. For example, a user may swipe a finger on a fingerprint reading device, perform a retinal scan, present their face in front of a camera for facial recognition, or other biometric scan. In another example, a user may enter a card or device on which may be stored electronic identification.

After credentials are received in block 204, the credentials may be looked up in a local database in block 206. The local database lookup in block 206 may be performed for all credentials, regardless if the credentials are domain authenticated credentials or cloud authenticated credentials.

Domain authenticated credentials may be those credentials where the domain server is the authentication authority. Cloud authenticated credentials may be those where the cloud authentication mechanism is the authentication authority. In the example of embodiment 200, the operation is the same for either type of authentication authority.

If the credentials are found in the database in block 208, and the credentials match in block 210, and the credentials are for a local account in block 211, the user may be logged on with local privileges in block 212 and may operate the client device with local privileges in block 214. When the user finishes and logs off in block 216, the process may return to block 202.

If the credentials are not present in the database in block 208, the user may never have previously logged into the local device. In the client device of embodiment 200, all credentials are stored locally. A copy of domain or cloud authenticated credentials may be stored locally so that authentication may occur when a network connection is down or if the authentication mechanism is offline. This enables a user to gain access to the device and at least perform some operations.

When the credentials are not present in block 208, the credentials may be transmitted to a domain or cloud authentication mechanism. When the device of embodiment 200 is a domain attached device, the credentials may be transmitted to a domain authentication mechanism in block 218. When the device is a workgroup device, the credentials in block 208 may be transmitted to the cloud authentication mechanism.

If the credentials are found in block 208 but do not match in block 210, the credentials may be passed to block 218. Such a condition may occur when a user enters a known user name but a different password. The user name may be found in block 208 but the password may not be found in the user database in block 210.

In some cases, a user may have logged into a cloud authentication mechanism or other domain device and changed passwords or other credentials. In such a case, the credentials presented in block 204 would pass the check of block 208 but fail the check of block 210. In such a case, the credentials may be passed to the authoritative authentication mechanism in block 218.

If the credentials pass both block 208 and 210, but the credentials are not for a domain account in block 211, the credentials may be passed to block 218. In some cases not illustrated in embodiment 200, the credentials may be accepted and used for domain privileges. Embodiment 200 illustrates an embodiment where every domain login is authenticated by the domain authority.

In block 218, the credentials are transmitted to the next level of authentication authority. In the case of a domain authority, the credentials may be passed to the domain authentication mechanism. The operation of a domain server with cloud authentication may be illustrated in embodiment 300 presented later in this specification.

In the case of a workgroup device, the credentials may be transmitted to the cloud authentication mechanism in block 218.

After transmitting the credentials in block 218, the client device may wait until a token is received from the authenticating authority in block 220.

If the token indicates that the authentication is approved in block 222, the credentials may be stored in the local user database in block 224. If the credentials are for local access in block 226, the process may proceed to block 212 where the user may login and use the device with local privileges. If the credentials are for domain access in block 226, the user may login with domain privileges in block 228 and may operate with domain privileges in block 230 until logging off in block 232, at which point the process may return to block 202.

If the token indicates that the credentials were not authenticated in block 222, an error message may be generated in block 234 and the process may return to block 202.

Figure 3:
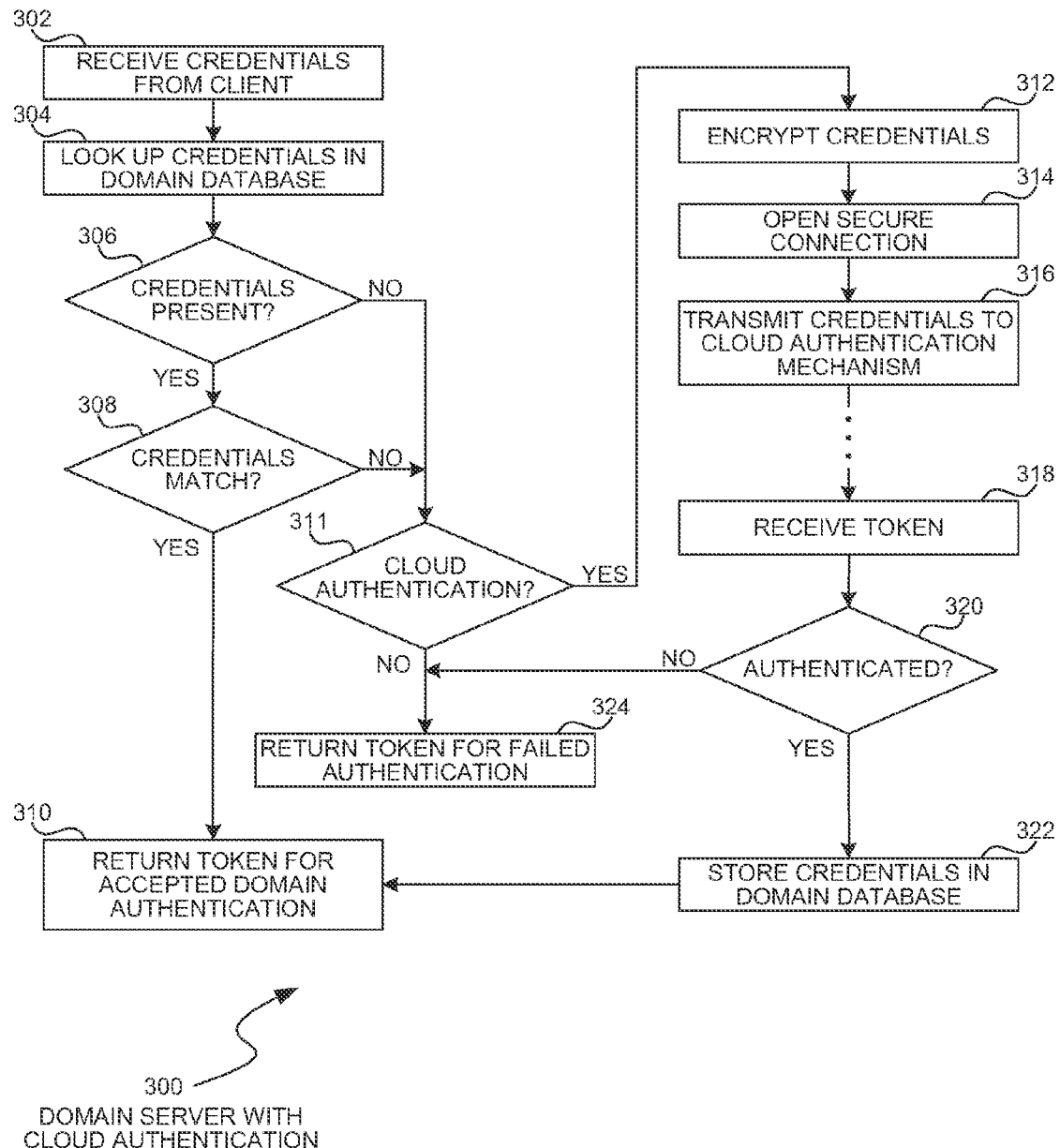
FIG. 3 is a flowchart illustration of an embodiment showing a method that may be performed by a domain server with cloud authentication.

FIG. 3 is a flowchart illustration of an embodiment 300 showing a method for operating a domain server with cloud authentication. Embodiment 300 is a method that may be performed by a domain server, such as the domain server 102 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates an authentication method that may use a cloud authentication mechanism as an authentication authority for some user accounts. Other user accounts may be authenticated by the domain authentication authority.

The credentials may be received from a client device in block 302. The credentials received in block 302 may be the same credentials that are transmitted in block 218 of embodiment 200.

The credentials are looked up in the user database in block 304.

If the credentials are present in block 306 and match in block 308, a token may be returned in block 310 to accept domain authentication. In such a situation, the user may be authenticated using either domain or cloud authentication. When cloud authentication is used in this embodiment, a copy of the credentials accepted by the cloud authentication mechanism may be stored locally and used for subsequent authentications.

On a periodic basis, the credentials for cloud authenticated accounts may be reset. An example is illustrated in embodiment 400 presented later in this specification and may serve as a mechanism to cause the cloud authenticated credentials to be re-verified on a regular basis.

If the credentials are not present in block 306, and the credentials are not for a cloud authenticated account in block 311, a token may be returned in block 324 for a failed authentication.

In some embodiments, a new set of credentials is presented in block 306 may be identified as a cloud authenticated set of credentials in block 311. The credentials may be identified as cloud authenticated credentials by their form, such as having an email address with a domain name from a cloud authentication mechanism.

Some embodiments may be configured so that any cloud authenticated account may be granted access to the domain. Such embodiments may be used where the cloud authentication mechanism may be located within a wide area network under the control of a corporation or other enterprise, or where any user with access to the cloud system may be granted access to the domain.

If the credentials are found in block 306 but do not match in block 308, the user may have entered a known user name but a different password. If the credentials are also for a cloud authentication account in block 311, the credentials may be sent to the cloud authentication mechanism.

When credentials are sent to the cloud authentication mechanism from block 311, the credentials may be encrypted in block 312, a secure connection may be opened in block 314, and the credentials may be transmitted to the cloud authentication mechanism in block 316.

Some embodiments may not include encryption and secure channel communications. Some embodiments may perform a hash on the credentials and transmit the hashed value in place of a clear text version of some or all of the credentials.

A token may be received from the cloud authentication mechanism in block 318. The token may be any message, indicator, or other mechanism to transmit an approval or disapproval of the authentication request. In embodiments where encryption is used, the token may be encrypted for transmission and decrypted by the domain controller.

If the token indicates that the credentials are valid, the credentials may be stored in the local database in block 322 and a token may be transmitted to the requesting client device in block 310 indicating acceptance of the credentials.

If the token indicates that the credentials are not valid, a token indicating authentication failure may be transmitted to the client device in block 324.

The method of embodiment 300 uses the locally stored user database to verify credentials. If the credentials are found in the database and match properly, an authentication request may be approved even when the credentials are for an account that may be cloud authenticated. In order to prevent the credentials from becoming stale or having the user update the credentials directly with the cloud authentication mechanism, the credentials may be deleted or expired. An example of such a method is presented in embodiment 400.

Figure 4:
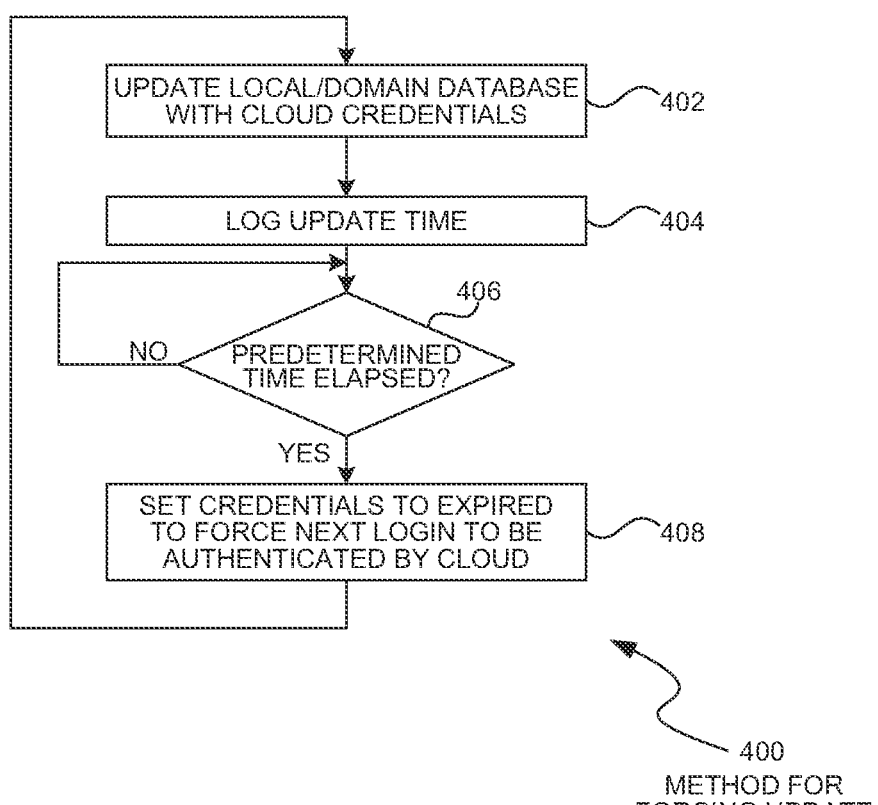
FIG. 4 is a flowchart illustration of an embodiment showing a method for forcing an update.

FIG. 4 is a flowchart illustration of an embodiment 400 showing a method for forcing an update to cloud authenticated credentials. Embodiment 400 is a method that may be performed by a local authentication mechanism, which may be a workgroup or domain authentication mechanism.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 402, the local or domain user database may be updated with cloud credentials. Block 402 may represent block 224 for a local database such as a workgroup device or domain client. Block 402 may also represent the actions of block 322 for a domain server.

The update time may be logged in block 404, and a timer may process in block 406 until a predetermined time has elapsed.

Once the predetermined time has elapsed, the credentials may be forced to expire in block 408. One mechanism to force the credentials to expire may be to erase a password or other portion of the credentials. In some cases, the credentials may be stored with a flag indicating that the credentials may be refreshed by the cloud authentication mechanism on the next login.

When the credentials are expired or deleted, the condition of a failed credential match of block 210 or block 308 in embodiments 200 and 300, respectively, would be triggered. The condition may cause the credentials to be transmitted to the cloud authentication mechanism and verified, then stored in the local database. When the credentials are stored in the local database, they may be used for authentication until the predetermined time of block 406 is reached and the credentials are refreshed again in a subsequent login.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A domain server comprising:
   a processor;
   a local area network connection to a plurality of client devices;
   a wide area network connection to a cloud authentication mechanism;
   a database comprising user identification and passwords;
   a domain authentication mechanism configured to perform a method comprising:
      receiving a first authentication request from a first client device, said authentication request comprising a first user identification and a first password;
      transmitting said first user identification and said first password to said cloud authentication mechanism;
      receiving a first acceptance token from said cloud authentication mechanism;
      based on said first acceptance token, storing said first user identification and said first password in said database;
      transmitting a second acceptance token to said first client device
      receiving a second authentication request from a second client device, said second authentication request comprising said first user identification and said first password;
      looking up said first user identification and said first password in said database and determining that said first user identification and said first password are found in said database; and
      transmitting a third acceptance token to said second client device without performing a cloud authentication.

2. The domain server of claim 1, said first user identification being identified as a cloud authenticated user identification.

3. The domain server of claim 1, said method further comprising:
   receiving a third authentication request from said first client device, said third authentication request comprising said first user identification and a second password;
   checking said database to determine that said first user identification and said second password do not match said database;
   transmitting said first user identification and said second password to said cloud authentication mechanism,
   receiving a third acceptance token from said cloud authentication mechanism; and
   based on said third acceptance token, transmitting a fourth acceptance token to said first client device and updating said database by removing said first password and storing said second password.

4. The domain server of claim 3, said method further comprising:
   receiving a fourth authentication request from said first client device, said fourth authentication request comprising said first user identification and said second password;
   checking said database to determine that said first user identification and said second password do not match said database;
   transmitting said first user identification and said second password to said cloud authentication system,
   receiving a first failure token from said cloud authentication mechanism; and
   based on said first failure token, transmitting a second failure token to said first client device.

5. The domain server of claim 1, said first user identification having a cloud authentication identifier.

6. The domain server of claim 5, said method comprising:
   receiving a second authentication request from a second client device, said second authentication request comprising a second user identification and a second password;
   determining that said second user identification has a local authentication indicator;
   checking said database to determine that said second user identification and said second password do match said database, generating a failure token, and transmitting said failure token without performing a cloud authentication.

7. The domain server of claim 1, said transmitting to said cloud authentication mechanism being performed using a secure connection.

8. The domain server of claim 1, said method further comprising:
performing a hash on said first password to generate a hashed value and transmitting said first password in the form of said hashed value to said cloud authentication mechanism.

9. The domain server of claim 1, said wide area network connection comprising a connection through said local area network connection to a gateway to said wide area network.

10. The domain server of claim 1 further comprising:
an expiration mechanism configured to determine when a predetermined amount of time has elapsed since said storing said first user identification and causing said first password to be expired.

11. The domain server of claim 10, said causing said first password to be expired comprising erasing said first password from said database.

12. The domain server of claim 1, said database being a duplicate of a second database located on a second domain server, said second domain server being configured to authenticate users.

13. A workgroup computer comprising:
a processor;
a wide area network connection to a cloud authentication mechanism;
a database comprising user identification and passwords;
a domain authentication mechanism configured to perform a method comprising:
receiving a first authentication request for a first user, said first authentication request comprising a first user identification and a first password;
determining if the first authentication request is configured for cloud authentication;
transmitting said first user identification and said first password to said cloud authentication mechanism when the first authentication request is configured for cloud authentication;
receiving a first acceptance token from said cloud authentication mechanism;
based on said first acceptance token, storing said first user identification and said first password in said database;
permitting access for said first user to said workgroup computer;
receiving a second authentication request for said first user, said second authentication request comprising said first user identification and said first password;
looking up said first user identification and said first password in said database and determining that said first user identification and said first password are found in said database; and
permitting access for said first user to said workgroup computer without performing a cloud authentication.

14. The workgroup computer of claim 3, said method further comprising:
receiving a third authentication request for said first user, said third authentication request comprising said first user identification and a second password;
checking said database to determine that said first user identification and said second password do not match said database;
transmitting said first user identification and said second password to said cloud authentication mechanism,
receiving a third acceptance token from said cloud authentication mechanism; and
based on said third acceptance token, permitting access for said first user to said workgroup computer and updating said database by removing said first password and storing said second password.

15. A computer-readable storage medium not comprising a signal, said medium comprising computer executable instructions configured to perform a method comprising:
receiving a first authentication request for a first user, said first authentication request comprising a first set of credentials;
determining that said first user has a cloud authenticated account and transmitting said first set of credentials to a cloud authentication mechanism;
receiving a first acceptance token from said cloud authentication mechanism;
storing said first set of credentials to a user database;
permitting access for said first user to a computer system based on said first acceptance token;
receiving a second authentication request for the first user, said second authentication request comprising a second set of credentials;
determining that said second set of credentials are not a match to credentials in said user database;
transmitting said second set of credentials to said cloud authentication mechanism;
receiving a second acceptance token from said cloud authentication mechanism; and
updating said user database by replacing the first set of credentials for the first user with the second set of credentials.

16. The medium of claim 15 said method further comprising encrypting at least a portion of said first set of credentials before said transmitting.

17. The medium of claim 15 said computer system being the same computer system as executes said computer executable instructions.

18. The method of claim 15, said computer system being a different computer system as executes said computer executable instructions.

* * * * *